United States Patent
Onimatsu

(10) Patent No.: US 9,757,914 B2
(45) Date of Patent: Sep. 12, 2017

(54) TIRE VULCANIZING APPARATUS

(71) Applicant: SUMITOMO RUBBER INDUSTRIES, LTD., Kobe-shi, Hyogo (JP)

(72) Inventor: Hiroyuki Onimatsu, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 181 days.

(21) Appl. No.: 14/420,603

(22) PCT Filed: Aug. 30, 2013

(86) PCT No.: PCT/JP2013/073403
§ 371 (c)(1),
(2) Date: Feb. 9, 2015

(87) PCT Pub. No.: WO2014/034887
PCT Pub. Date: Mar. 6, 2014

(65) Prior Publication Data
US 2015/0231842 A1    Aug. 20, 2015

(30) Foreign Application Priority Data

Sep. 3, 2012  (JP) ................. 2012-193400

(51) Int. Cl.
*B29D 30/06* (2006.01)
*B29D 30/30* (2006.01)
*B29D 30/00* (2006.01)

(52) U.S. Cl.
CPC ..... *B29D 30/0603* (2013.01); *B29D 30/0606* (2013.01); *B29D 30/30* (2013.01);
(Continued)

(58) Field of Classification Search
CPC ............ B29D 30/0016; B29D 30/0603; B29D 30/0606; B29D 30/0643; B29D 30/0661;
(Continued)

(56) References Cited

U.S. PATENT DOCUMENTS 6,241,501 B1    6/2001  Mitamura
8,696,970 B2 *  4/2014  Mancini ............ B29D 30/0601
                                                            156/135
(Continued)

FOREIGN PATENT DOCUMENTS

JP    2001-1346 A    1/2001
JP    2003-89120 A   3/2003
(Continued)

OTHER PUBLICATIONS

Extended European Search Report, dated May 17, 2016, for European Application No. 13832041.1.

*Primary Examiner* — James Mackey
(74) *Attorney, Agent, or Firm* — Birch, Stewart, Kolasch & Birch, LLP

(57) ABSTRACT

In order to improve tire production efficiency, there is provided a conveying apparatus that conveys a tire-accompanied rigid core in a lying-sideways position to a loading position P1, a preheating device for preheating at a preheating position P2, a vulcanizing device for vulcanizing at a vulcanizing position P3, a cooling device for cooling at a cooling position P4, and a transferring device. The transferring device has a turning arm capable of turning horizontally around an axis of turning and movable up and down, and transfers the tire-accompanied rigid core from and to the conveying device, the preheating device, the vulcanizing device, and the cooling device at the positions P1 to P4. The loading position P1, the preheating position P2, the vulcanizing position P3 and the cooling position P4 are arranged on the same circumferential line centered on the axis of turning.

11 Claims, 14 Drawing Sheets

(52) U.S. Cl.
CPC ...... *B29D 30/0005* (2013.01); *B29D 30/0016* (2013.01); *B29D 30/0643* (2013.01); *B29D 30/0661* (2013.01); *B29D 2030/0607* (2013.01)

(58) Field of Classification Search
CPC .... B29D 2030/0022; B29D 2030/0027; B29D 2030/0607; B29D 30/0005
See application file for complete search history.

(56) References Cited

U.S. PATENT DOCUMENTS

| | | |
|---|---|---|
| 2004/0234637 A1 | 11/2004 | Ito et al. |
| 2006/0169392 A1 | 8/2006 | Akiyama et al. |
| 2007/0029028 A1 | 2/2007 | Cordaillat et al. |
| 2010/0084076 A1* | 4/2010 | Mariani ............ B29D 30/0016 156/111 |

FOREIGN PATENT DOCUMENTS

| | | |
|---|---|---|
| JP | 2006-297778 A | 11/2006 |
| JP | 2009-160949 A | 7/2009 |
| JP | 2011-161896 A | 8/2011 |
| JP | 2011-167979 A | 9/2011 |
| WO | WO 2008/129736 A1 | 10/2008 |

* cited by examiner

FIG.13
(A)
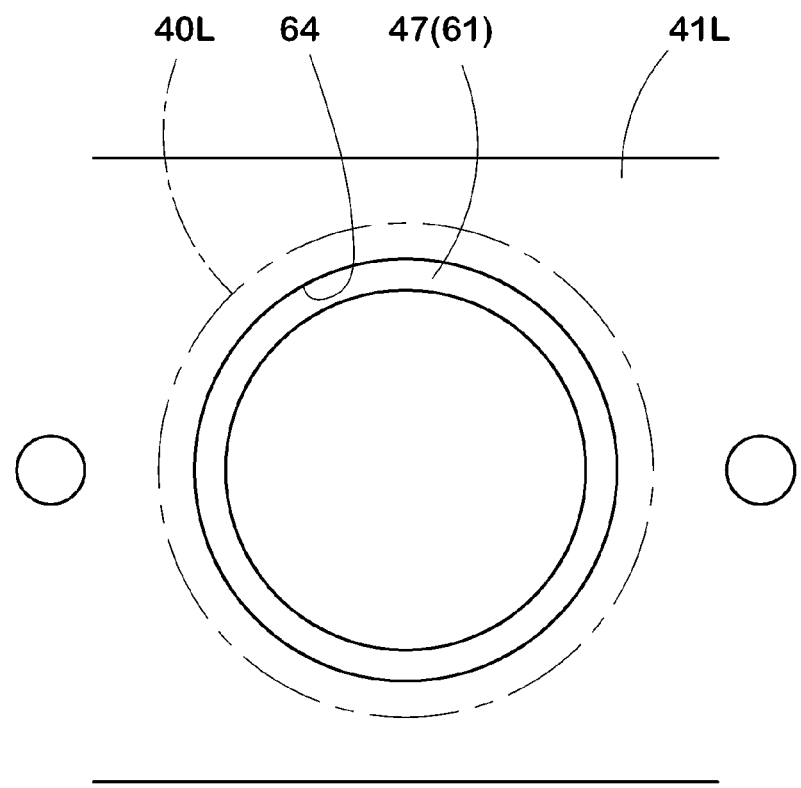
(B)
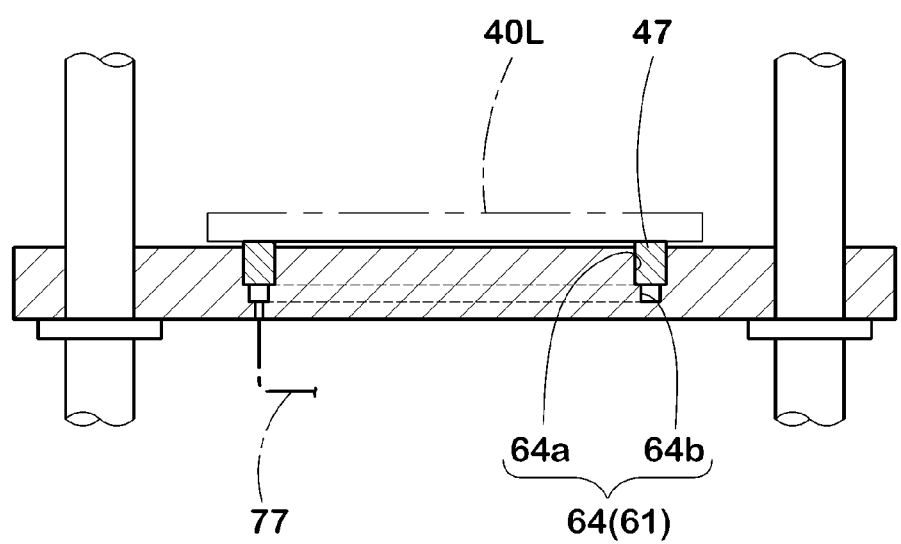

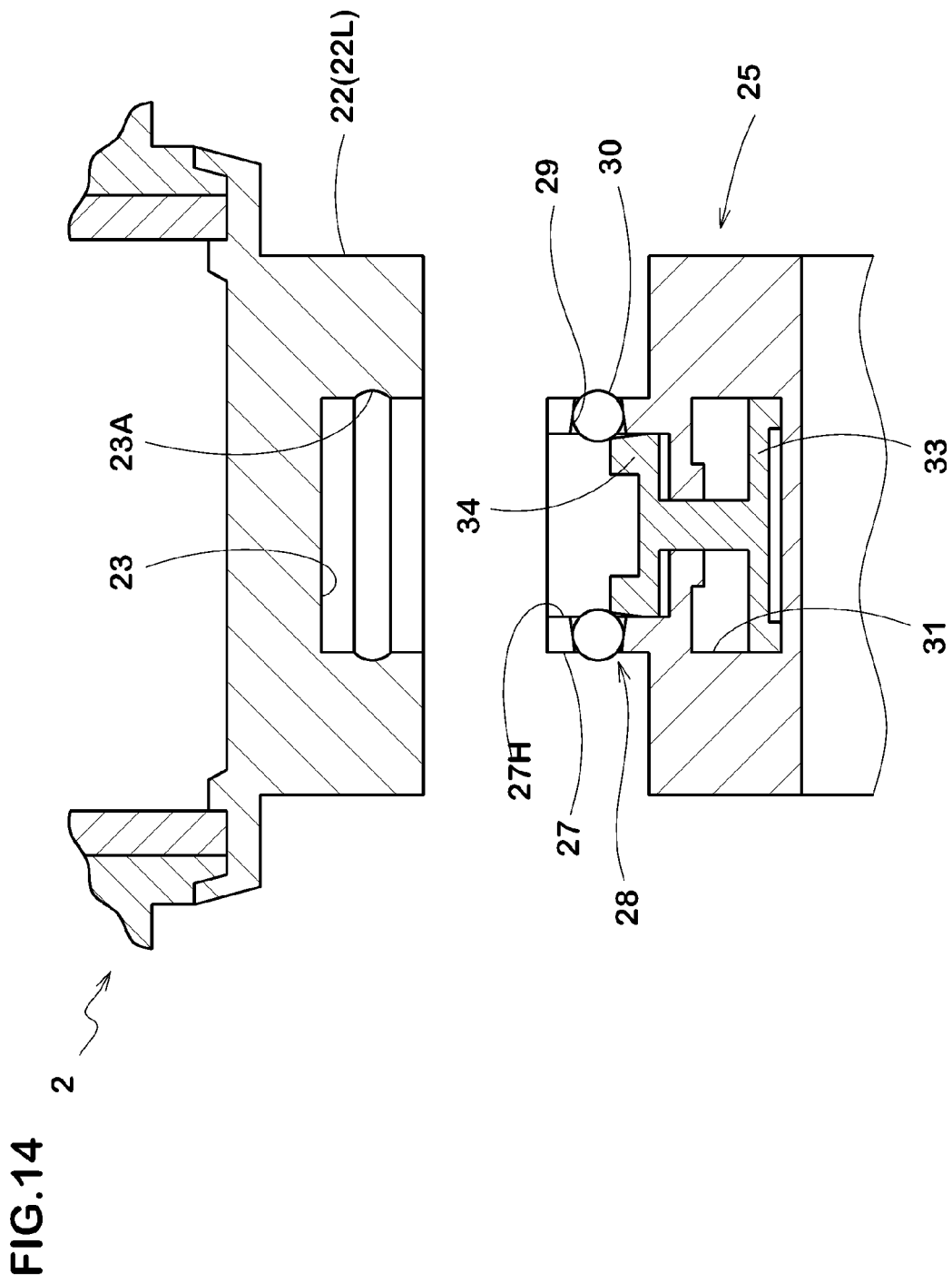

TIRE VULCANIZING APPARATUS

TECHNICAL FIELD

The present invention relates to a tire vulcanizing apparatus for vulcanization-molding a green tire formed on the outer surface of a rigid core by putting it in a vulcanizing mold together with the rigid core.

BACKGROUND ART

In recent years, in order to improve tire forming accuracy, a tire forming method utilizing a rigid core (hereinafter, called "core method") has been proposed. (cf. Patent documents 1, 2 for example)
The rigid core has an outer shape which substantially accord with the inner surface of the vulcanized tire.
On the outer surface of the rigid core, by applying tire construction members, an inner liner, a carcass ply, a belt ply, a sidewall rubber, a tread rubber and the like in series, a green tire is formed.
The green tire is put in a vulcanizing mold together with the rigid core, and the green tire is vulcanization-molded between the rigid core as an inner mold and the vulcanizing mold as an outer mold.
In the core method, after the completion of the vulcanization, the rigid core and the vulcanized tire which are combined into one are took out from the vulcanizing mold. At that moment, the rigid core and the vulcanized tire are in a high-temperature state of 160 to 190 deg. C.
Accordingly, if the combined is left as it is (naturally-cooled), it takes much time to cool the rigid core down to a safe temperature (for example, about 50 deg. C.). Therefore, it takes much time to disassemble and remove the rigid core from the vulcanized tire to furnish it to another subsequent green tire forming process, and there is a problem of lowered production efficiency.
Further, if the combined is left as it is (naturally-cooled), there is a possibility that the vulcanized tire is over-vulcanized by the heat from the rigid core, and the quality of the tire is decreased.
In the vulcanization process, on the other hand, it is required to quickly heat up the rigid core to the vulcanization temperature in order to shorten the time for the vulcanization process and improve the production efficiency.
But, in the green tire forming process, the rigid core is in a lowered temperature state.
Therefore, if the heating is started after the rigid core is put in the mold, it takes long time to raise the temperature of the rigid core, and it becomes difficult to fully achieve the shortening of the time for the vulcanization process.
In the core method, as the rigid core is repeatedly used as explained above, the following is important in order to increase the production efficiency
(a) to cool the rigid core quickly as far as possible and remove it from the vulcanized tire after the vulcanization process, and furnish it to another subsequent green tire forming process,
(b) to raise the temperature of the rigid core quickly as far as possible in the vulcanization process, and shorten the time for the vulcanization process.

PRIOR ART DOCUMENTS

Patent Documents

Patent document 1 JP-A-2011-161896
Patent document 2 JP-A-2011-167979

SUMMARY OF THE INVENTION

Problems to be Resolved by the Invention

It is an object of the present invention to provide a tire vulcanizing apparatus in which, by performing preheating, vulcanizing and cooling in series upon a tire-accompanied rigid core introduced into a loading position, the time for the vulcanization process and the time to furnish the rigid core to another subsequent green tire forming process after the vulcanization can be reduced, and the tire production efficiency can be improved.

Means of Solving the Problems

The present invention is a tire vulcanizing apparatus for vulcanization-molding a green tire formed on the outer surface of a rigid core by putting it in a vulcanizing mold together with the rigid core,
characterized by having
  a conveying means for conveying
a tire-accompanied rigid core on the outer surface of which a green tire is formed to a loading position P1 in a lying-sideways attitude in which the tire axis becomes vertical,
  a preheating means for
receiving the tire-accompanied rigid core at a preheating position P2 and
preheating it at the preheating position P2,
  a vulcanizing means for
receiving the preheated tire-accompanied rigid core at a vulcanizing position P3 and
vulcanizing it at the vulcanizing position P3,
  a cooling means for
receiving the vulcanized tire-accompanied rigid core at a cooling position P4 and
cooling it at the cooling position P4,
  a transferring means for transferring the tire-accompanied rigid core
from and to the conveying means, the preheating means, the vulcanizing means and the cooling means,
at the loading position P1, the preheating position P2, the vulcanizing position P3 and the cooling position P4, wherein
  the transferring means comprises a turning arm horizontally turnable around an axis of turning and movable up and down, and
  the loading position P1, the preheating position P2, the vulcanizing position P3 and the cooling position P4 are arranged on a circle whose center is on the axis of turning.

Effect of the Invention

As described above, the tire vulcanizing apparatus of the present invention has the conveying means for conveying the tire-accompanied rigid core to the loading position P1, the preheating means for preheating the tire-accompanied rigid core at the preheating position P2, the vulcanizing means for vulcanizing the preheated tire-accompanied rigid core at the vulcanizing position P3, the cooling means for cooling the vulcanized tire-accompanied rigid core at the cooling position P4, and the transfer mean.
The transferring means is able to transfer the tire-accompanied rigid core from and to the conveying means, the preheating means, the vulcanizing means and the cooling means, at the loading position, the preheating position, the vulcanizing position and the cooling position.

Accordingly, upon the tire-accompanied rigid core introduced into the loading position, the tire vulcanizing apparatus can perform the preheating, the vulcanizing and the cooling in series.

Accordingly, it is possible to shorten the time for the vulcanization process and the time to furnish the rigid core to another subsequent green tire forming process after the vulcanization, and the tire production efficiency can be improved.

In addition, the transferring means has the turning arm which is capable of turning horizontally around the axis of turning and movable up and down.

Further, the loading position, the preheating position, the vulcanizing position and the cooling position are arranged on the same circumferential line centered on the axis of turning. Accordingly, the structure of the transferring means is simplified, and it is possible to make the transferring-from-and-to of the tire-accompanied rigid core at the loading position, the preheating position, the vulcanizing position and the cooling position with high accuracy. This can contribute to downsizing of the tire vulcanizing apparatus.

BRIEF DESCRIPTION OF DRAWINGS

FIG. 13 (A), (B) are a plan view and a cross sectional view diagrammatically showing a pressure device of the mold clamp means.

FIG. 14 a cross sectional view showing a coupling of a connector section and a support shaft part.

MODE FOR CARRYING OUT THE INVENTION

Hereinafter, an embodiment of the present invention will now be described in detail.

Figure 1:
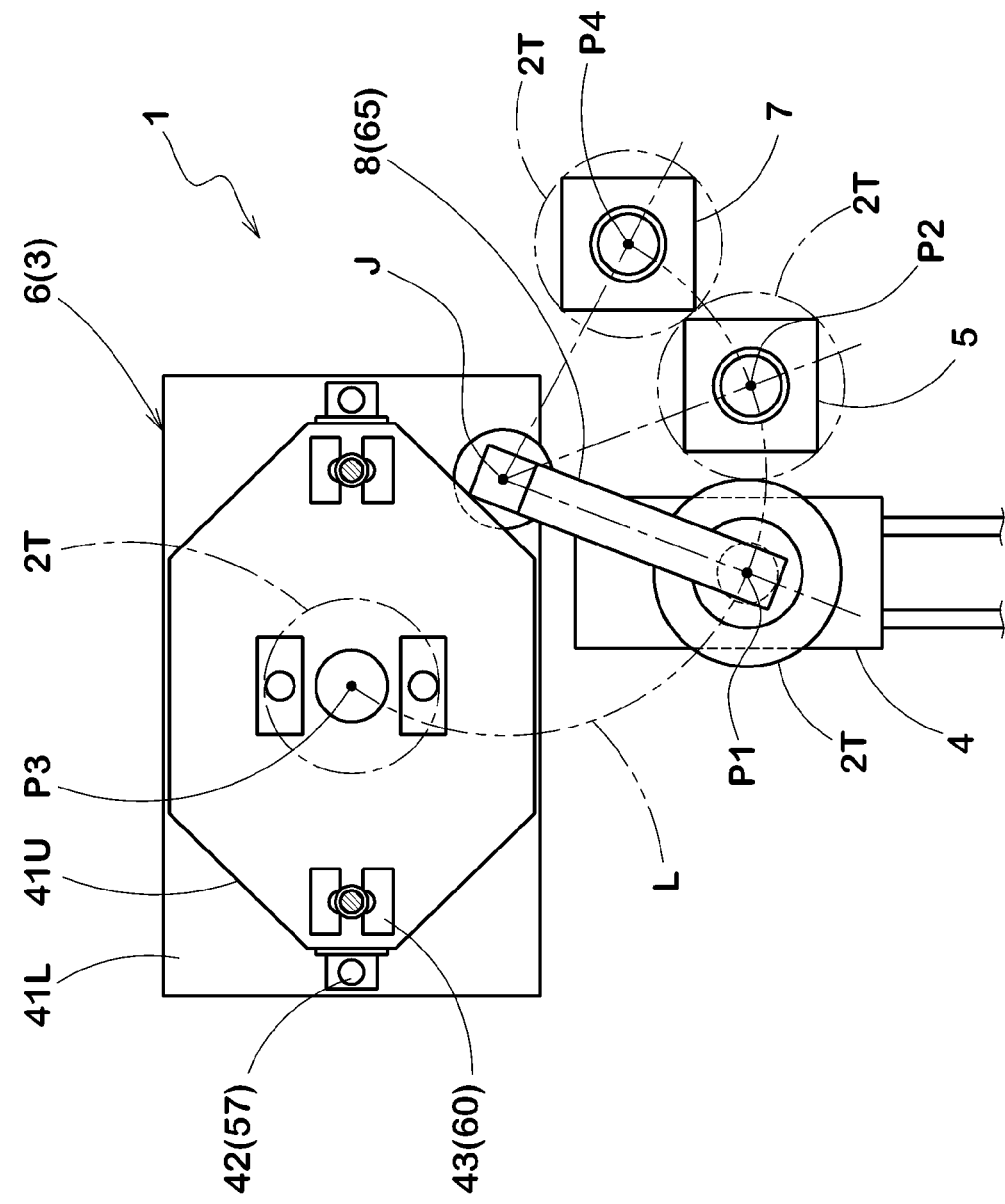
FIG. 1 a plan view showing an embodiment of the tire vulcanizing apparatus of the present invention.
Figure 11:
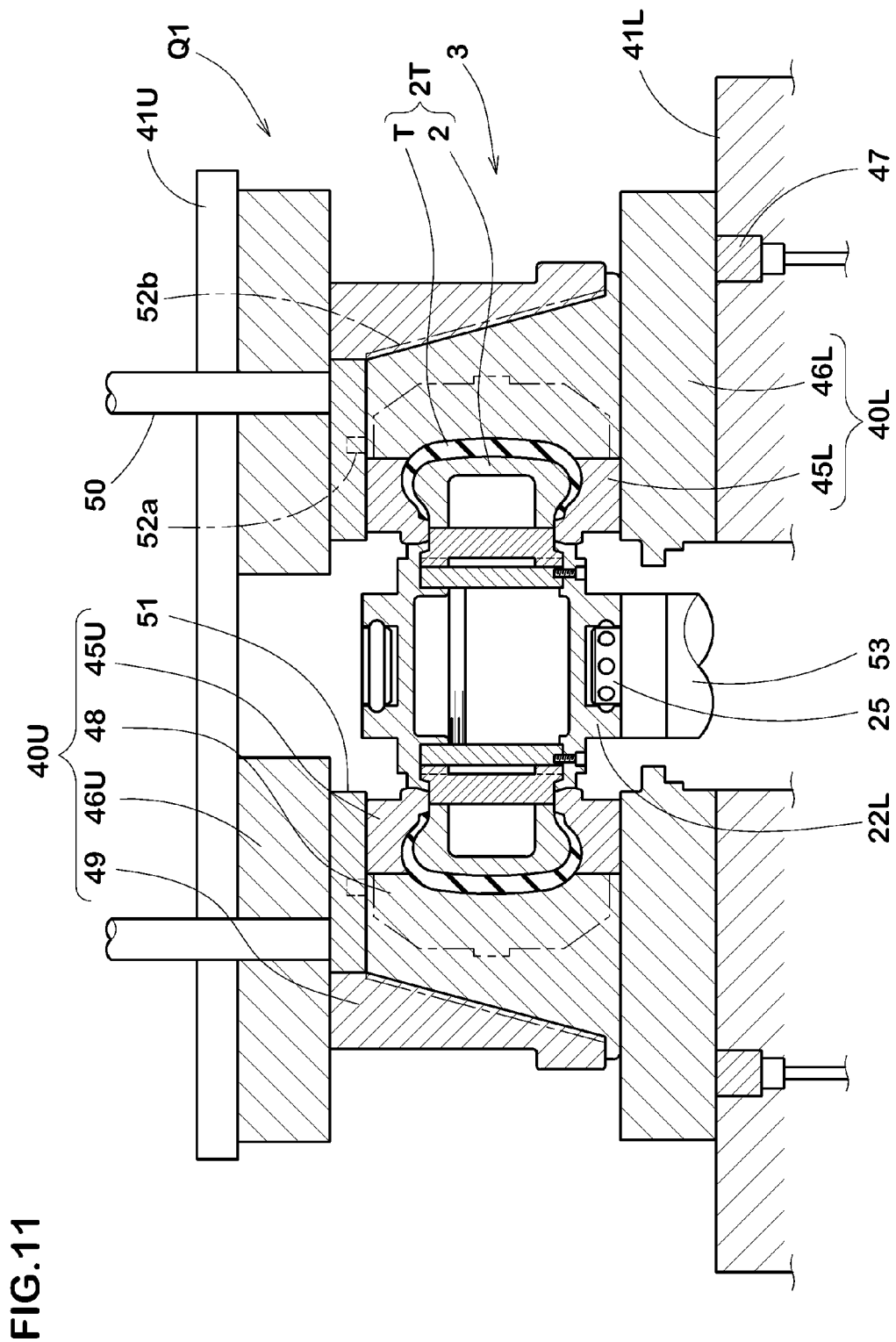
FIG. 11 a cross sectional view showing a closed state of the mold.

The tire vulcanizing apparatus 1 in this embodiment is an apparatus for vulcanization-molding a green tire T formed on the outer surface of a rigid core 2 by putting it into a vulcanizing mold 3 together with the rigid core 2 as shown in FIG. 11. As shown in FIG. 1, the tire vulcanizing apparatus 1 has a conveying means 4, a preheating means 5, a vulcanizing means 6, a cooling means 7 and a transferring means 8.

The conveying means 4 conveys a tire-accompanied rigid core 2T on the outer surface of which the green tire T is formed, to a loading position P1.

The preheating means 5 preheats the conveyed tire-accompanied rigid core 2T at a preheating position P2.

The vulcanizing means 6 vulcanizes the preheated tire-accompanied rigid core 2T at a vulcanizing position P3.

The cooling means 7 cools the vulcanized tire-accompanied rigid core 2T at a cooling position P4.

The transferring means 8 transfers the tire-accompanied rigid core 2T from and to the preheating means 5, the vulcanizing means 6 and the cooling means 7, at the loading position P1, the preheating position P2, the vulcanizing position P3 and the cooling position P4 the conveying means 4.

The transferring means 8 has a turning arm 65 which is capable of turning horizontally around an axis of turning 7 and movable up and down.

The loading position P1, the preheating position P2, the vulcanizing position P3 and the cooling position P4 are disposed on the same circumferential line L centered on the axis of turning J.

Figure 7:
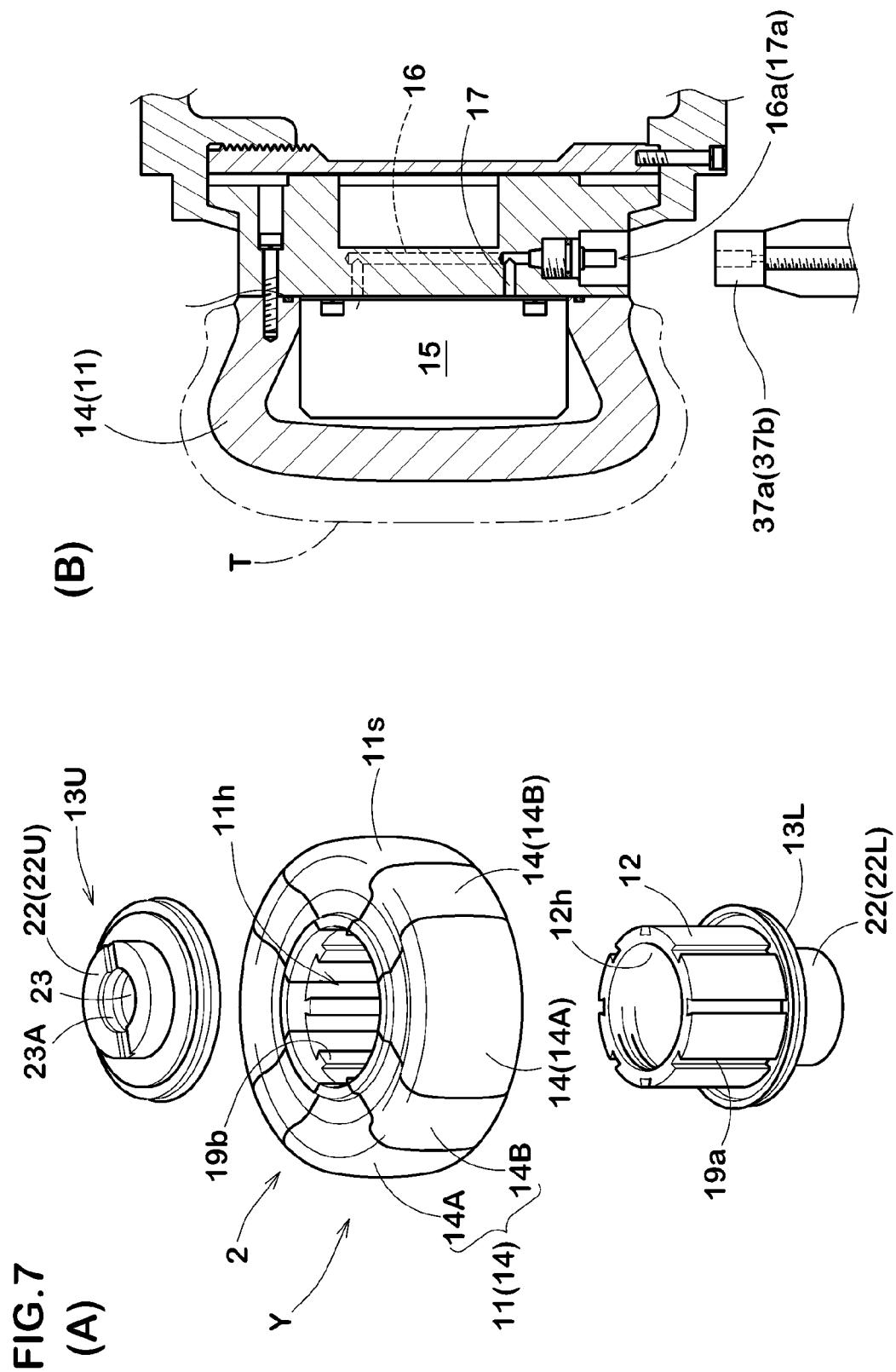
FIG. 7 (A) is an exploded perspective view showing the rigid core. (B) is a cross sectional view of a core segment.

As shown in FIG. 7(A), the rigid core 2 has a toroidal core main body 11, and a support shaft part 22 attached to the core main body 11 and protruding toward both outer sides in the tire axis direction coaxially with the tire axis.

The rigid core 2 in this example has a core main body 11, a cylindrical core 12 inserted in a bore 11*h* of the core main body 11, and a pair of side walls 13L, 13U disposed on both sides of the core main body 11 in the axis direction.

The outer surface 11*s* of the core main body 11 has an outer shape which is substantially the same as the inner surface of the vulcanized tire.

On the outer surface 11*s*, a green tire T is formed.

The core main body 11 is composed of a plurality of circumferentially divided segments 14.

The segments 14 are first and second segments 14A, 14B arranged alternately in the circumferential direction.

Both end faces in the circumferential direction, of the first segment 14A are inclined to such directions that the width in the circumferential direction is gradually decreased toward the radially inside.

Both end faces in the circumferential direction of the second 1 segment 14B are inclined to such directions that the width in the circumferential direction is gradually increased toward the radially inside.

The outer circumference surface of the core 12 and the inner circumferential surface of the segments 14 are provided with dovetail grooves 19*a* and dovetail tenons 19*b* extending in the axis direction and engaging with each other. Thereby, the core 12 and the segments 14 are coupled relatively movably only in the axis direction.

One side wall 13L is fixed to one end in the axis direction, of the core 12, and the other side wall 13U is detachably attached to the other end.

In this example, the other side wall 13U is screwed in and fixed to the bore 12*h* of the core 12.

The side walls 13L, 13U are provided with the support shaft part 22 in a protruding manner.

The support shaft part 22 is compose of a downwardly protruding lower support shaft part 22L and an upwardly protruding upper support shaft part 22U in a lying-sideways attitude Y in which the tire axis is laid vertical.

Each of the support shaft parts 22L, 22U is provided with
a coupling hole 23 coaxially provided in its outer end portion, and
a circumferential groove 23A extending along the inner circumferential surface of the coupling hole 23.

Such support shaft parts 22L, 22U are detachably automatically coupled to connector sections 25 (shown in FIG. 14) respectively provided in the conveying means 4, the preheating means 5, the vulcanizing means 6, the cooling means 7 and the transferring means 8.

As shown in FIG. 7(B), each segment 14 is provided in its inside with a chamber 15, a supply channel 16 and an evacuation channel 17.

The chamber 15 is formed in each segment 14 as a closed hollow space.

One end of the supply channel 16 and one end of the evacuation channel 17 are opened to the chamber 15.

The other end of the supply channel 16 and the other end of the evacuation channel 17 lead to connection ports 16a, 17a opened in the under side in the axis direction of the segments 14.

The connection ports 16a, 17a are formed leaving space in the circumferential direction.

Figure 8:
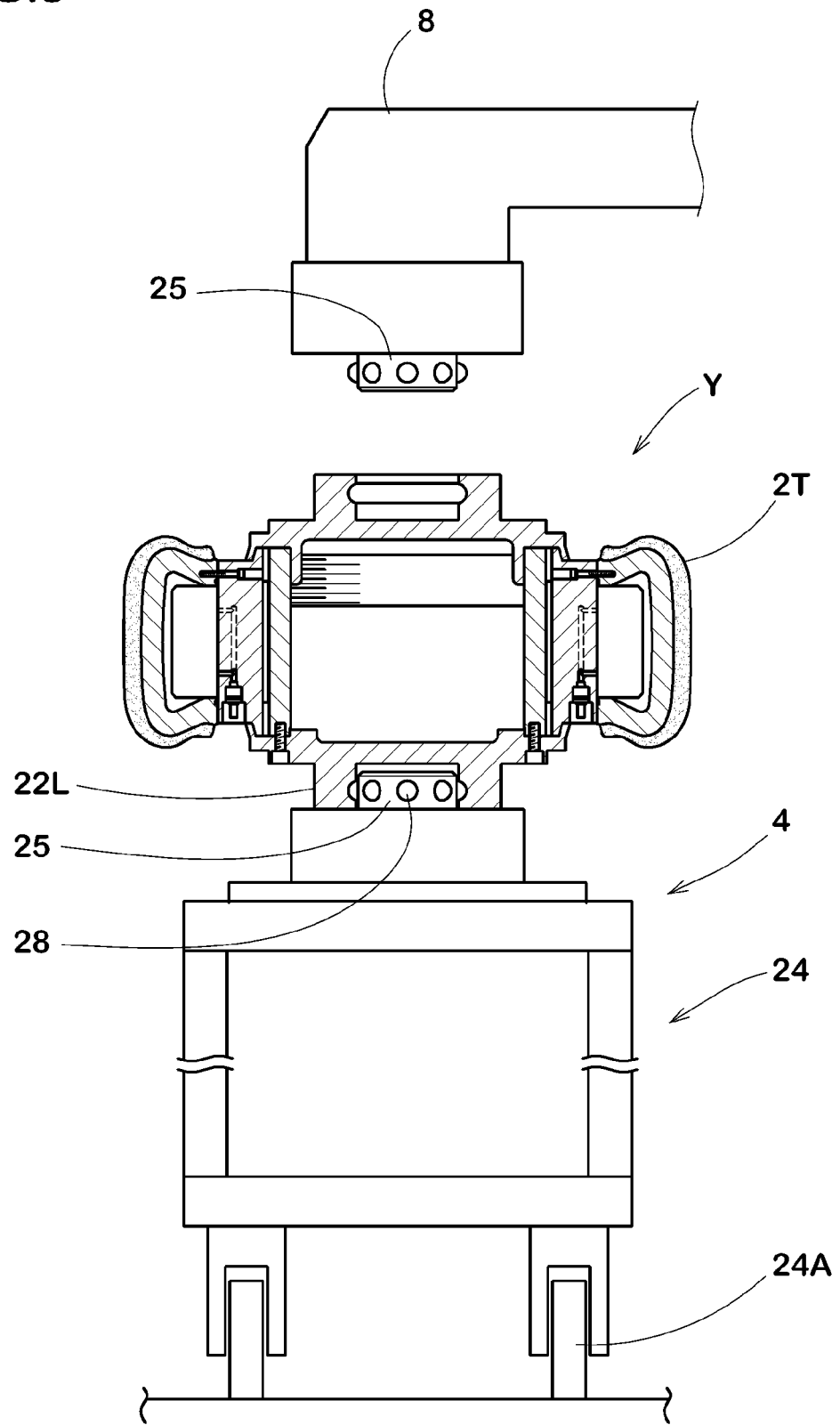
FIG. 8 a front view showing the conveying means.

Next, as shown in FIG. 8, the conveying means 4 of the tire vulcanizing apparatus 1
conveys the tire-accompanied rigid core 2T to the loading position P1 while keeping the lying-sideways attitude Y.

The conveying means 4 in the this example has
a dolly section 24 provided with wheels 24A, and the connector section 25 mounted on the dolly section 24.

The connector section 25 has a ball lock mechanism 28, and is capable of coupling with the lower support shaft part 22L of the tire-accompanied rigid core 2T in the lying-sideways attitude Y.

specifically, as shown in FIG. 14, the connector section 25 has
a cylindrical joining part 27 which is inserted in the coupling hole 23, and
the ball lock mechanism 28 locking between the coupling hole 23 and the cylindrical joining part 27.

The ball lock mechanism 28 has rigid balls 30, a piston 33, and a plunger 34.

The rigid balls 30 are retained within a plurality of through-holes 29 formed on a circumferential wall of the cylindrical joining part 27.

The through-holes 29 are arranged dispersedly in the circumferential direction, and each penetrate through the circumferential wall in the radially inside and outside direction.

The piston 33 is disposed within a cylinder room 31 provided in the connector section 25.

The piston 33 is moved within the cylinder room 31 inwardly or outwardly in the axis direction
by supplying compressed air to the cylinder room 31 or discharging it therefrom.

The plunger 34 is disposed in a bore 27H of the cylindrical joining part 27, and coupled to the piston 33 so as to be movable together.

The plunger 34, which is moved outwardly in the axis direction by the piston 33, pushes out each of the rigid balls 30 radially outwardly.

Thereby, each rigid ball 30 is pressed against the circumferential groove 23A, and the support shaft part 22 and the connector section 25 are locked.

On the other hand, by moving the piston 33 toward the inside in the axis direction, the plunger 34 releases the pushed-out rigid balls 30.

In this way, the locking and unlocking between the connector section 25 and the support shaft part 22 can be made automatically.

The preheating means 5 is as shown in FIG. 1, placed in the preheating position P2.

The preheating means 5 receives, at the preheating position P2, the carried-in tire-accompanied rigid core 2T, and preheats it at the preheating position P2.

The cooling means 7 is placed in the cooling position P4.
The cooling means 7 receives, at the cooling position P4, the vulcanized tire-accompanied rigid core 2T, and cools it at the cooling position P4.

Figure 9:
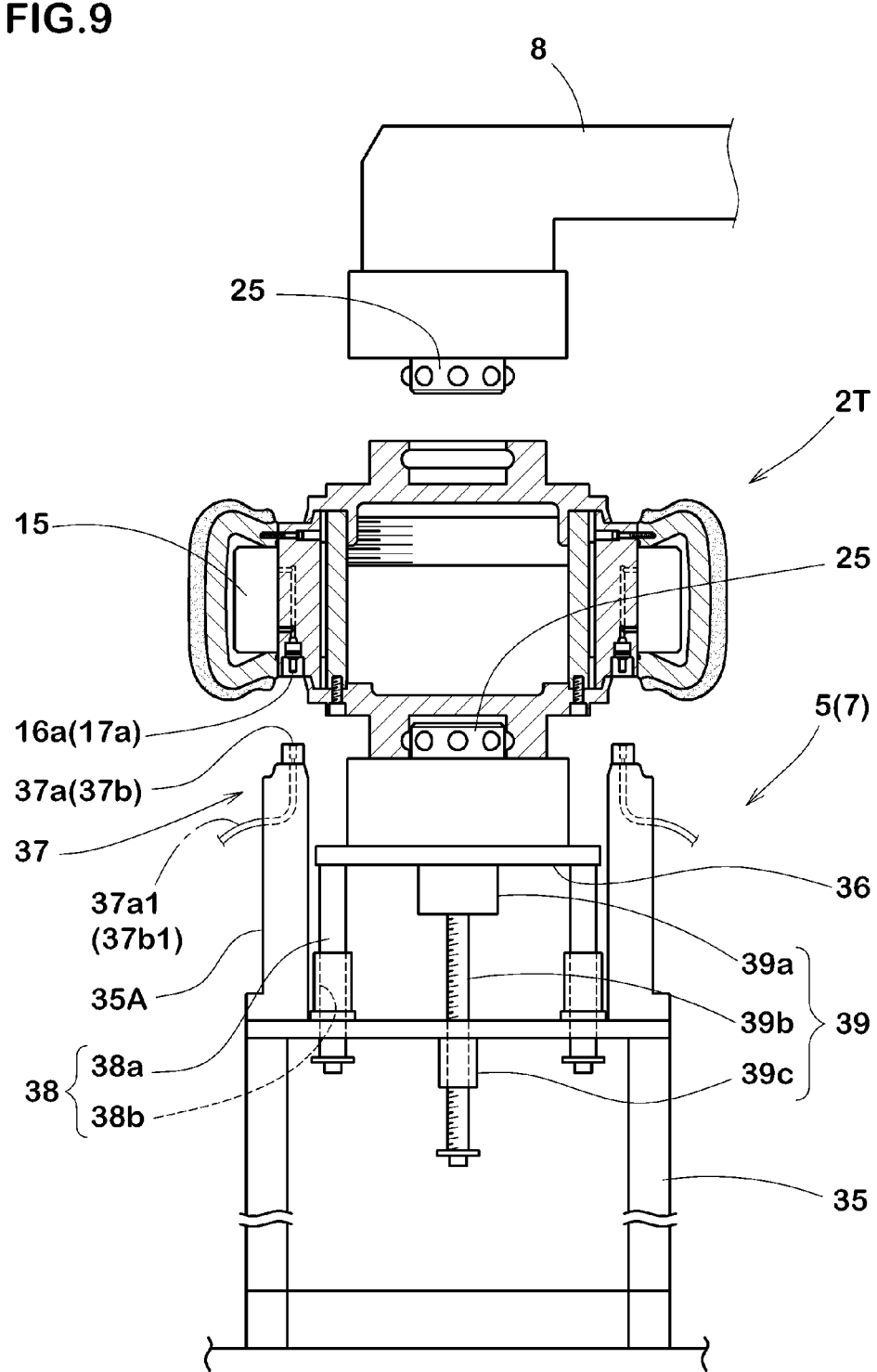
FIG. 9 a front view showing the preheating means and the cooling means.

The preheating means 5 and the cooling means 7 are of the substantially same structure, and are constructed to include
a fixed table 35,
a lift table 36 supported by the fixed table 35 in such a manner that it is elevated and lowered freely,
a connector section 25 mounted on the lift table 36, and
a fluid supply means 37 for supplying fluid for cooling or fluid for heating into the chamber 15 of the tire-accompanied rigid core 2T, as shown in FIG. 9.

The lift table 36 in this example is guided, in such a manner that it is elevated and lowered freely, by a guide means 38 which includes
a plurality of guide shafts 38a extending downwardly from the lift table 36, and
a plurality of guide holes 38b provided on a top board of the fixed table 35 and slidably guiding the respective guide shafts 38a in the up-and-down direction.

To the lift table 36 in this example, a motor 39a is fixed, and an upper end of a screw axis 39b is connected to the motor 39a. To the top board of the fixed table 35, a ball nut 39c screwing with the screw axis 39b is fixed.

The motor 39a, the screw axis 39b and the ball nut 39c constitute the lifting and lowering means 39.

The lift table 36 is moved up and down according to rotational motion of the screw axis 39b by the motor 39a.

The fluid supply means 37 is formed so as to include a supply port 37a and a discharge port 37b.

The supply port 37a is connectable, in the up-and-down direction, with the connection ports 16a of the supply channel 16 in the rigid core 2, and
the discharge port 37b is connectable, in the up-and-down direction, with a connection port 17a of the evacuation channel 17 in the rigid core 2.

In this example, each of the supply port 37a and the discharge port 37b is provided at the upper end of a supporting section 35A extending upwardly from the fixed table 35.

In the preheating means 5 and the cooling means 7, by the downward motion of the lift table 36 after receiving the tire-accompanied rigid core 2T from the transferring means 8, the connection ports 16a, 17a of the tire-accompanied rigid core 2T are respectively connected to the supply port 37a and the discharge port 37b.

To the supply port 37a, a supply pipe 37a1 extending from a fluid supply source (not shown) is connected, and the fluid from the fluid supply source is supplied to the chamber 15. To the discharge port 37b, a discharge pipe 37b1 is connected, and the fluid discharged from the chamber 15 is collected or circulated toward the fluid supply source.

In the preheating means 5, steam is suitably employed as the fluid for heating.

In the preheating by the preheating means 5, it is necessary to heat the green tire T at not more than 100 deg. C. (for example 60 to 100 deg. C.) so as not to cause vulcanization.

Accordingly, the flow volume and the temperature of the fluid for heating are controlled so that the temperature is within the above-mentioned range.

In the cooling means 7, on the other hand, cooling water of not more than 50 deg. C., preferably not more than 40 deg. C. is suitably employed as the fluid for cooling.

The vulcanizing means 6 is, as shown in FIG. 1, placed in the vulcanizing position P3.

The vulcanizing means 6 receives, at the vulcanizing position P3, the tire-accompanied rigid core 2T preheated by the preheating means 5, and vulcanizes it at the vulcanizing position P3.

Figure 2:
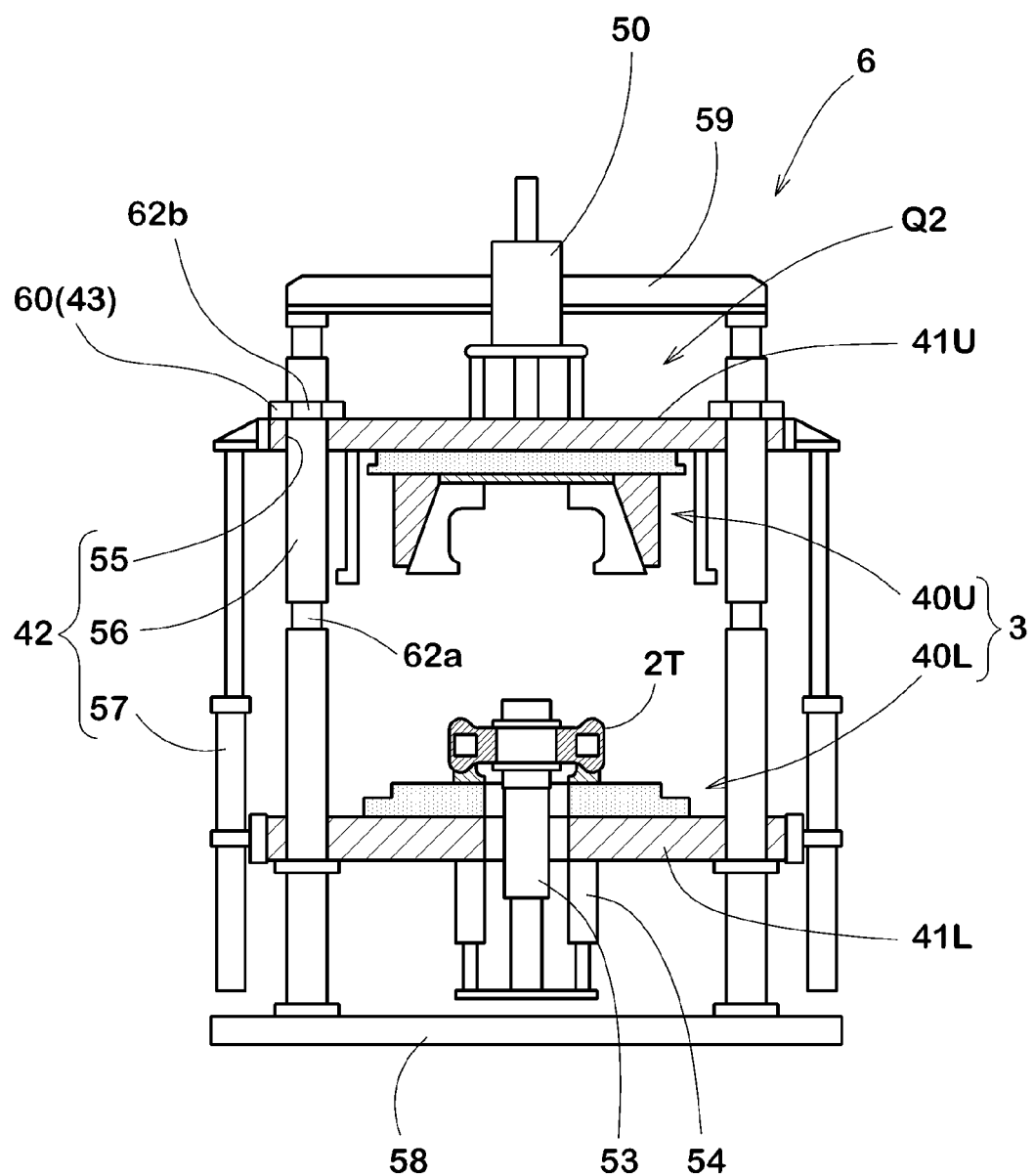
FIG. 2 a cross sectional view of the tire vulcanizing apparatus viewed from the front side.
Figure 3:
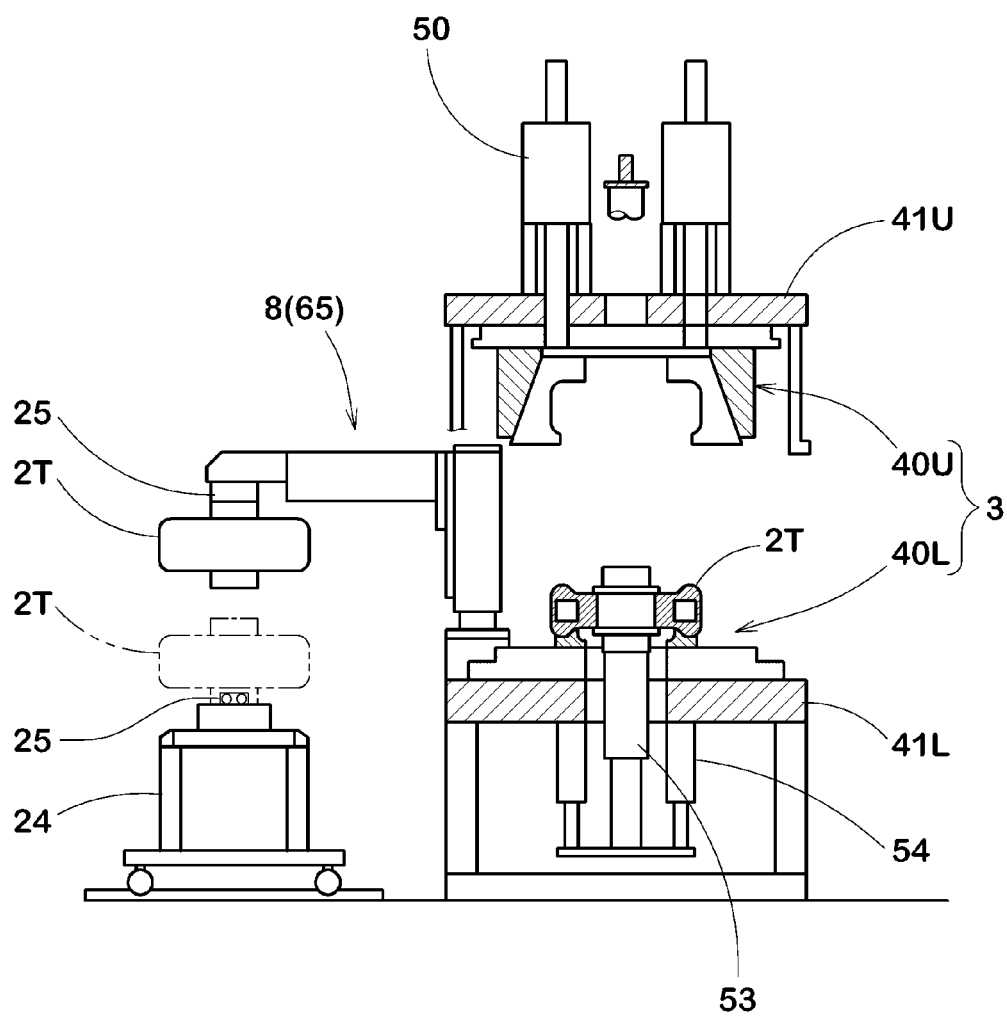
FIG. 3 a cross sectional view of the tire vulcanizing apparatus viewed from a lateral side.
Figure 4:
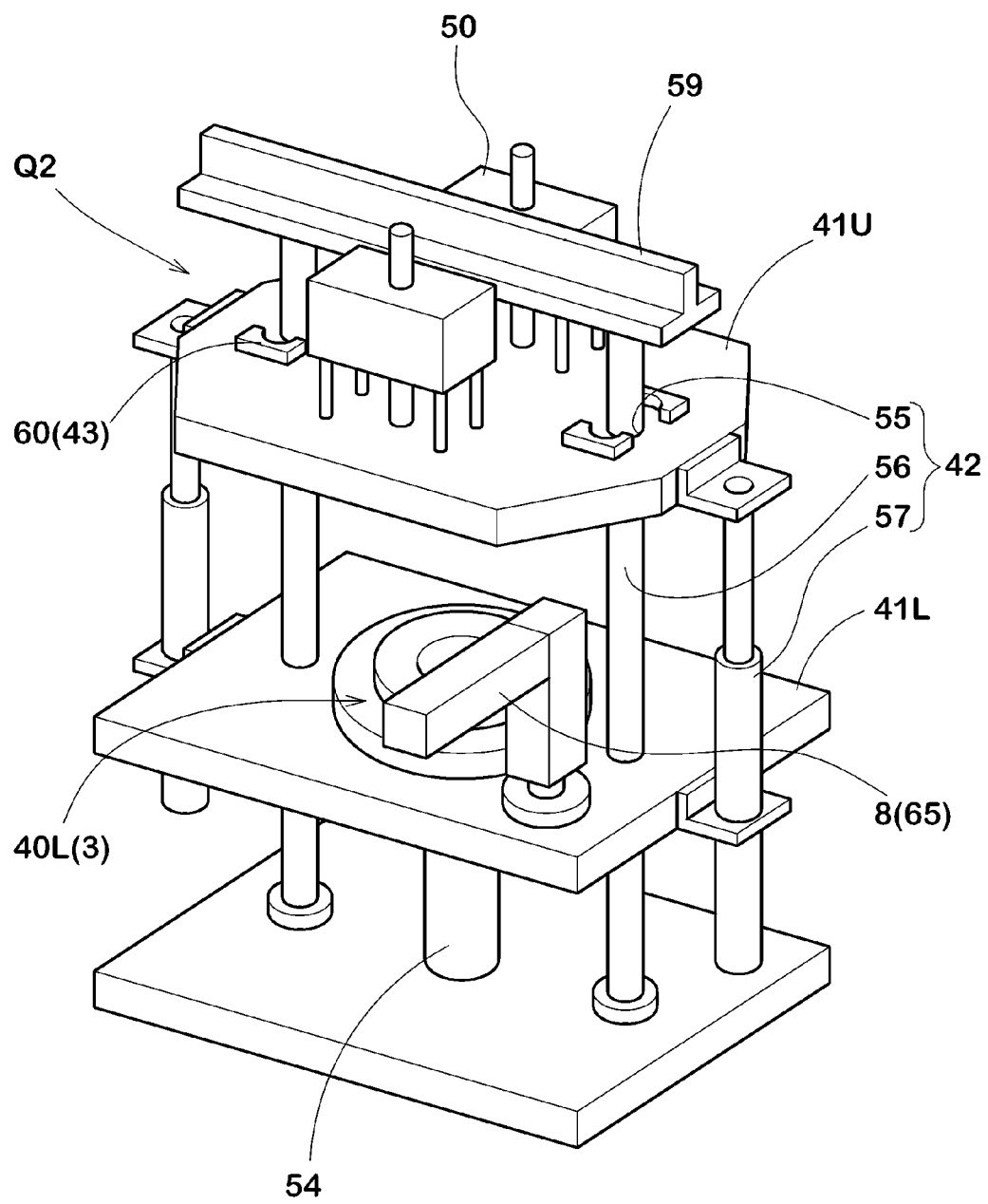
FIG. 4 a perspective view conceptually showing the tire vulcanizing apparatus.

As shown in FIGS. 2-4, the vulcanizing means 6 has
a lower bed 41L on which a lower mold section 40L is mounted,
an upper bed 41U on which a upper mold section 40U is mounted,
a lifting and lowering means 42 supporting the upper bed 41U in such a manner that it is elevated and lowered freely, and
closing the upper and lower mold sections 40U, 40L at a downside position Q1 (shown in FIG. 11), and
a mold clamp means 43 for clamping the upper and lower mold sections 40U, 40L at the downside position Q1.

The vulcanizing mold 3 is composed of the upper and lower mold sections 40U, 40L.

As to the upper and lower mold sections 40U, 40L, known structures are suitably employed without limited to specific structures.

For example, as shown in FIG. 11, the lower mold section 40L in this example includes
a lower sidewall mold 45L corresponding to a lower sidewall portion and a lower bead portion of the tire, and
a lower platen plate 46L for heating to support the lower sidewall mold 45L.

This platen plate 46L is attached to the lower bed 41L through the pressure plate 47.

The upper mold section 40U is constructed to include an upper sidewall mold 45U corresponding to an upper sidewall portion and an upper bead portion of the tire,
an expandable and contractable tread mold 48 corresponding to a tread portion of the tire,
an upper platen plate 46U for heating, and
a cylindrical container 49 for expanding or contracting the tread mold 48.

The upper platen plate 46U is attached to the upper bed 41U, and the container 49 is fixed to the upper platen plate 46U. The upper sidewall mold 45U is attached to a raising and lowering plate 51 which is supported, in such a manner that it is elevated and lowered freely, by the upper bed 41U through a pair of cylinders 50.

The tread mold 48 is supported by the raising and lowering plate 51 through a guide 52a movably in the tire radial direction toward the inside and outside.

The tread mold 48 is guided by a guide 52b provided in a conular inner circumferential surface of the container 49, in such a manner that it is movable upward and downward along the conular inner circumferential surface.

Accordingly, in the upper mold section 40U, the tread mold 48 can be expanded or contracted by moving the raising and lowering plate 51 in the up-and-down direction relatively to the upper bed 41U.

The vulcanizing means 6 has a core supporting shaft 53 for receiving the tire-accompanied rigid core 2T.

The core supporting shaft 53 is supported by a cylinder actuator 54 fixed to the under side of the lower bed 41L (shown in FIGS. 2 and 3) in such a manner that it is elevated and lowered freely, The core supporting shaft 53 is provided at the upper end thereof with a connector section 25 which is detachably attached to the lower support shaft part 22L of the tire-accompanied rigid core 2T to support it.

Figure 10:
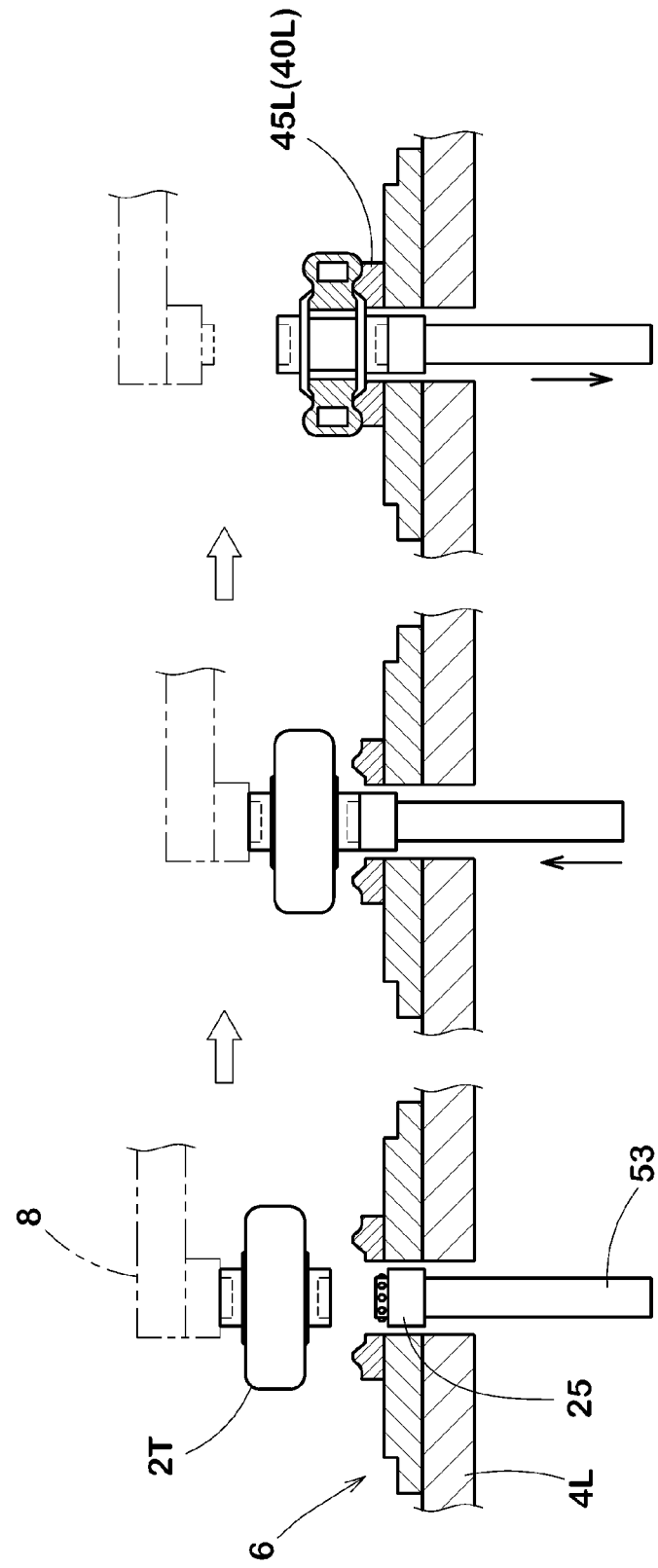
FIG. 10 a partial cross sectional view for explaining the transferring of the tire-accompanied rigid core to the vulcanizing means made with the transfer mean.

Accordingly, as shown in FIG. 10, the vulcanizing means 6 can receive the tire-accompanied rigid core 2T supported by the transferring means 8 by rising the core supporting shaft 53.

By lowering the core supporting shaft 53, it is possible to mount the received tire-accompanied rigid core 2T on the lower sidewall mold 45L.

At this time, it is possible to connect the connection ports 16a, 17a of the tire-accompanied rigid core 2T to a supply port and a discharge port (not shown) for vulcanization provided in the lower mold section 40L.

The supply port and the discharge port for vulcanization are substantially the same structures as the supply port 37a and the discharge port 37b, and supply and discharge steam as the fluid for vulcanization to and from the inside of the chamber 15.

As shown in FIGS. 2 and 4, the lifting and lowering means 42 has
guide holes 55 which penetrate through the upper bed 41U,
two fixed column rods 56 extending vertically and passing through the guide holes 55, and
two cylinder actuators 57 supported vertically by the lower bed 41L.

The guide holes 55 are disposed at positions point symmetry with respect to the tire axis.

In this example, the column rod 56 is a columnar support provided to stand on a bedplate 58 and extending vertically passing through the upper and lower beds 41U, 41L.

The lower bed 41L is fixed horizontally by four legs (not shown) for example.

The upper bed 41U is supported movably in the up and down direction with the guide holes 55 guided by the column rods 56. The upper ends of the column rods 56 are linked by a stay 59. The cylinder actuator 57 is fixed to the lower bed 41L vertically, and
the upper end of the rod thereof is fixed to the upper bed 41U. Accordingly, by extending the rod of the cylinder actuator 57, the lifting and lowering means 42 can lift the upper bed 41U from a downside position Q1 (shown in FIG. 11) to an upside position Q2 (shown in FIGS. 2 to 4).

The mold clamp means 43 has
a clamp device 60 clamping the column rod 56 at the downside position Q1, and
a pressure device 61 (shown in FIG. 13) tightening the upper and lower mold sections 40U, 40L between the upper bed 41U and the lower bed 41L.

As shown in FIG. 2, the column rod 56 is provided at a position corresponding to the downside position Q1 with a circumferential-groove-like constricted part 62a in the form of a step.

Figure 12:
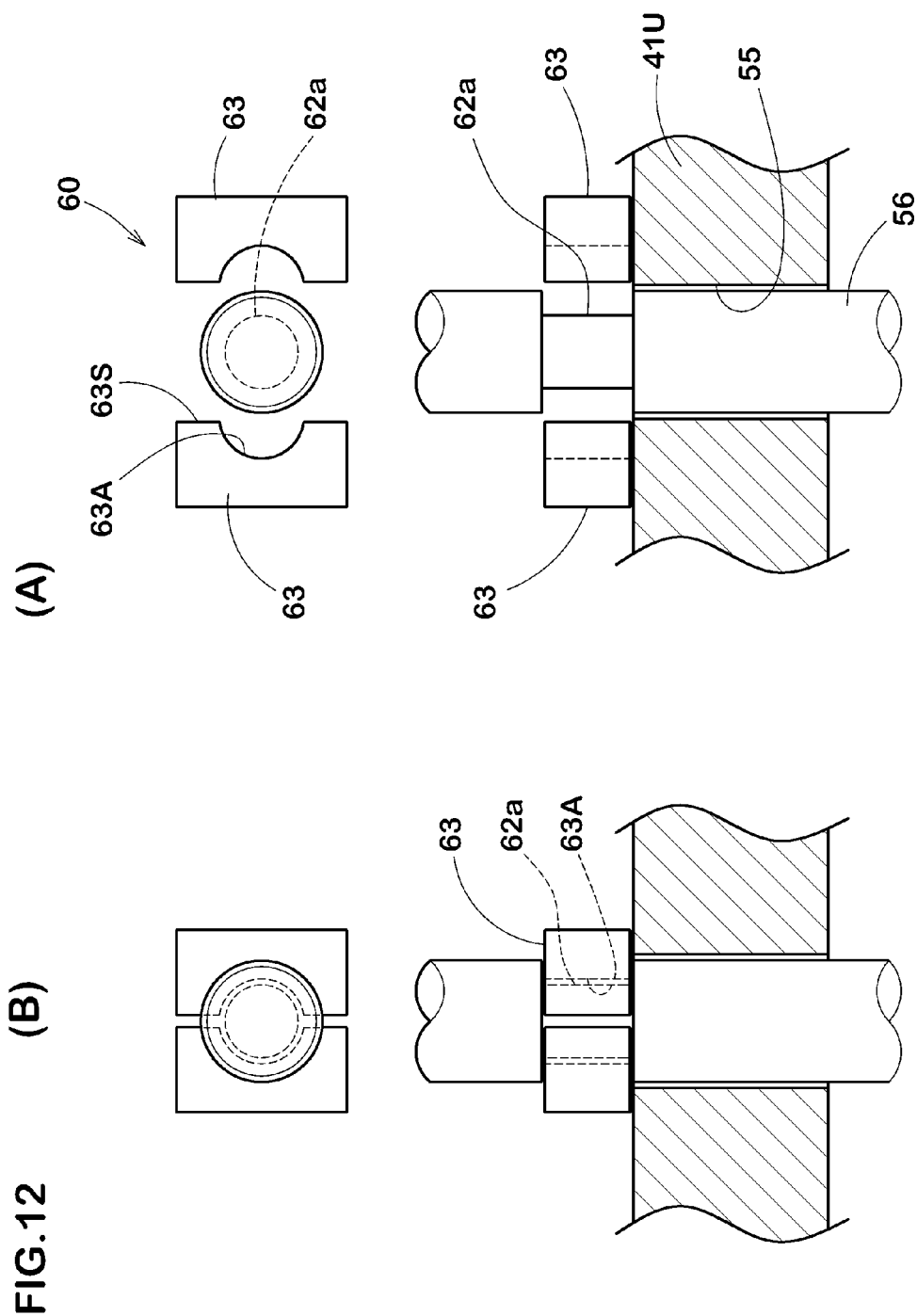
FIG. 12 (A), (B) illustrate the working of a clamp device of a mold clamp means.

As shown in FIGS. 12(A) and 12(B), the clamp device 60 is provided on to the upper bed 41U and cramps the constricted part 62a at the downside position Q1.
specifically, the clamp device 60 in this example has a pair of clamp pieces 63 like a halved block of which oppositely opposed faces 63S are provided with semicircular cut-out portions 63A. The clamp pieces 63 are supported by, for example, a known holding device (not shown) utilizing a cylinder actuator and the like so that the oppositely opposed faces 63S are oppositely opposed and so as to be movable forward and backward on the upper bed 41U.

At a forward position at which the oppositely opposed faces 63S come into contact with or close to each other, the cutout portions 63A form a latch hole into which the constricted part 62a is fitted. Thereby, it is possible to fix the upper bed 41U to the downside position Q1.

At a backward position at which they separate from each other, it is possible to release the constricted part 62a.

The column rod 56 is also provided at a position corresponding to the upside position Q2 with a circumferential-groove-like constricted part 62b, and it is possible to fix the upper bed 41U to the upside position Q2 by allowing the clamp device 60 to cramp the constricted part 62b.

As shown in FIGS. 13(A), 13(B), the pressure device 61 has an annular groove 64 formed in the upper surface of the lower bed 41L and being concentric with the lower mold section 40L, and an annular pressure plate 47 disposed in the annular groove 64 slidably in the up-and-down direction.

In this example, the annular groove 64 has a main groove portion 64a holding the pressure plate 47 slidably in the up-and-down direction, and a narrow-width sub groove portion 64b adjacent to the main groove portion 64a on the lower side thereof.

A supply channel 77 for high-pressure fluid is connected to the sub groove portion 64b.

The lower mold section 40L is provided on the upper surface of the pressure plate 47.

In the pressure device 61, therefore, by the high-pressure fluid flowing into the annular groove 64, the pressure plate 47 can lift up the lower mold section 40L.

Thereby, the upper and lower mold sections 40U, 40L are tightened between the upper bed 410 and the lower bed 41L.

Because the high-pressure fluid is used, the pressure device 61 can generate a large tightening force while keeping excellent durability.

Especially, as the device is annular, it is possible to uniformly apply the large tightening force, and high-precision tightening is possible even if the number of the column rods 56 is two.

As the structure is simple and compact, this contributes much to reducing of the equipment cost and downsizing of the equipment.

Figure 5:
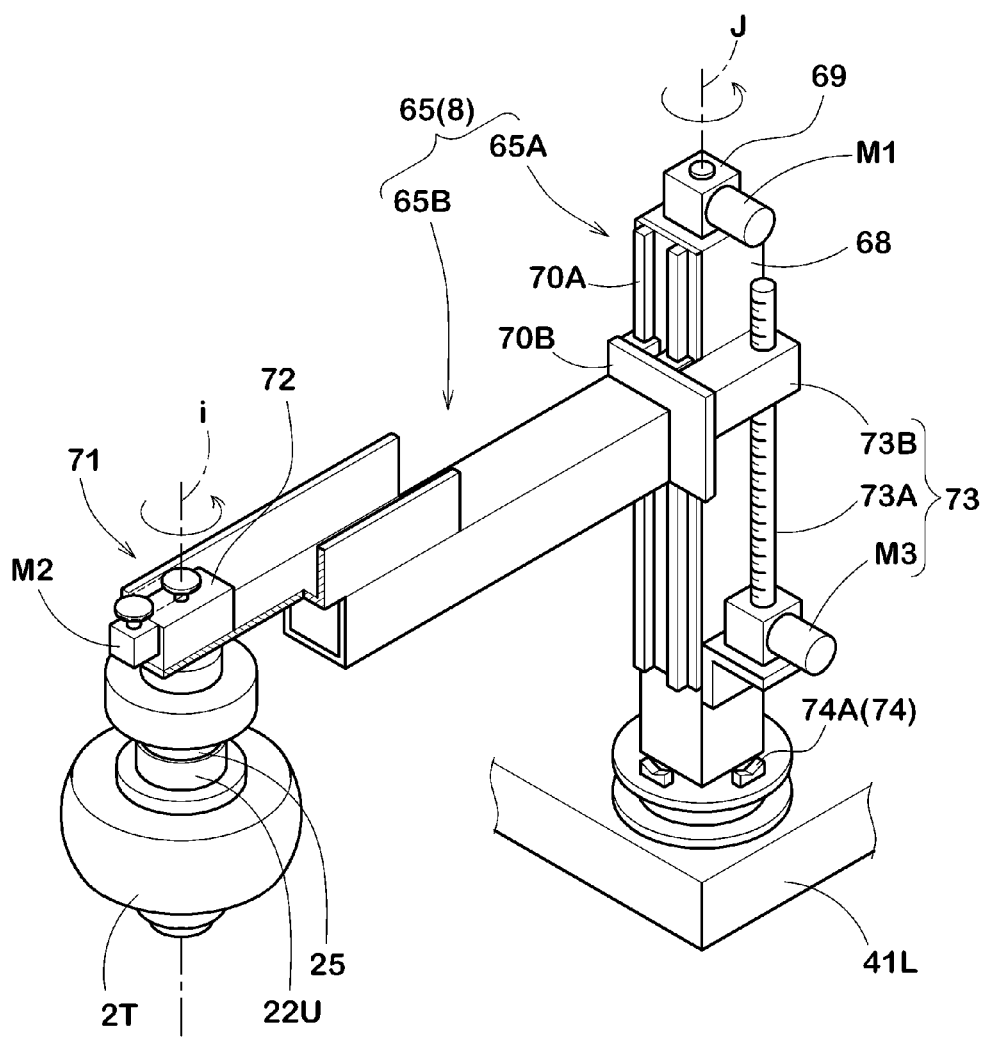
FIG. 5 a perspective view of showing the transfer mean.

As shown in FIG. 5, the transferring means 8 has a turning arm 65 which is capable of turning horizontally around the axis of turning 3, and which is movable up and down.

In this example, the turning arm 65 has a support rod portion 65A being turnable and rising from the lower bed 41L, a horizontal arm portion 65B supported by the support rod portion 65A in such a manner that it is elevated and lowered freely, and the connector section 25 provided at an end of the arm portion 65B and detachably coupled to the upper support shaft part 22U of the tire-accompanied rigid core 2T.

As shown in FIG. 6(A), the support rod portion 65A in this example has a fixed support shaft 66 disposed on the lower bed 41L in a standing manner, and a turning tube 68 in the form of a square tube supported by the support shaft 66 pivotally therearound through a bearing 67.

As shown in FIG. 5, a motor m1 is disposed at the upper end of the support shaft 66, and for example, the motor m1 is connected to the upper end of the turning tube 68 through a gear box 69 using a worm gear or the like.

Accordingly, by being driven by the motor M1, the turning tube 68 is turned around the axis of turning J which is concentric to the support shaft 66.

One of the side faces of the turning tube 68 is provided with a rail 70A extending in the up-and-down direction, and a raising and lowering plate 70B guided by the rail 70A.

To the raising and lowering plate 70B, one end of the arm portion 65B is fixed.

At the other end (tip end) of the arm portion 65B, the connector section 25 is provided.

Reference sign 71 in FIG. 5 is a turning means for turning the connector section 25 around the center of axle i.

The turning means 71 includes a motor M2 and a gear box 72.

Thereby, when the tire-accompanied rigid core 2T is transferred to the preheating means 5, the vulcanizing means 6 or the cooling means 7, it is possible to transfer it while positioning the connection ports 16a, 17a of the tire-accompanied rigid core 2T at the supply port 37a and the discharge port 37b of the preheating means 5, the vulcanizing means 6 or the cooling means 7.

Reference sign 73 in FIG. 5 is a lifting and lowering means for the arm portion 65B.

This lifting and lowering means 73 includes a vertical screw axis 73A pivotally supported by another side face of the turning tube 68 (in this example, adjacent to the above-mentioned one side face), a motor M3 associated with the lower end of the screw axis 73A, and a ball nut 73B threadably mounted on the screw axis 73A. The ball nut 73B is fixed to the raising and lowering plate 70B.

Figure 6:
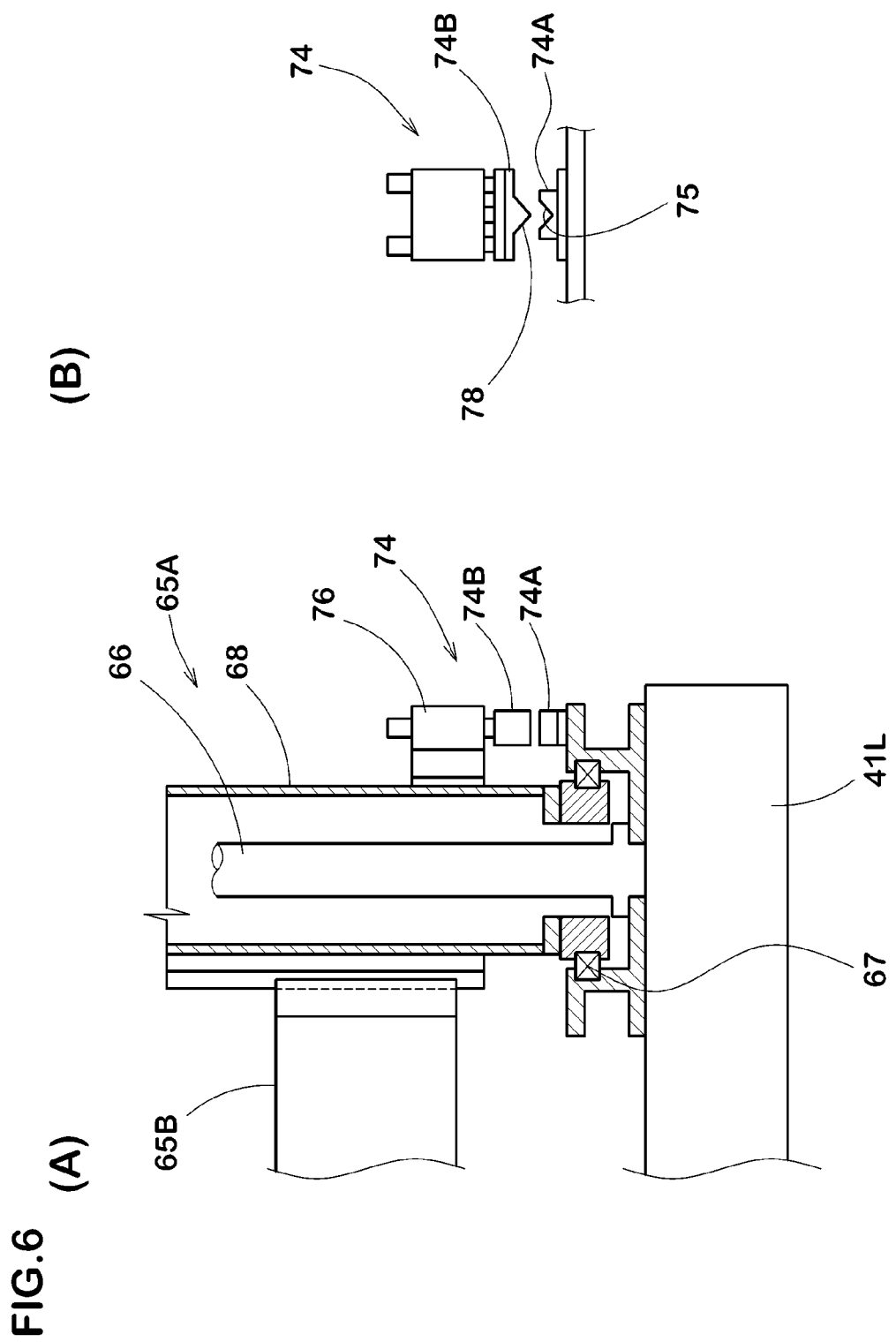
FIG. 6 (A) is a cross sectional view enlargedly showing the root part of the transfer mean. (B) is a front view showing a positioning means during turning.

Reference sign 74 in FIG. 6 is a positioning means for stopping the turning tube 68 at a predetermined turning position. This positioning means 74 includes a first engaging piece 74A disposed on the lower bed 41L side, and a second engaging piece 74B disposed on the turning tube 68 side and being engageable with the first engaging piece 74A.

The first engaging piece 74A is arranged at each of turning positions corresponding to the loading position P1, the preheating position P2, the vulcanizing position P3 and the cooling position P4.

In this example, each first engaging piece 74A is provided in the upper surface with a engaging groove 75 having a V-shaped cross section.

The engaging grooves 75 are formed along lines extending radially from the axis of turning J.

The second engaging piece 74B is attached to the lower end of the rod of a cylinder actuator 76 mounted on another side face of the turning tube 68 (in this example, opposite to the above-mentioned one side face).

The second engaging piece 74B is provided in the lower surface with an engaging protrusion 78 having a v-shaped cross section having the same inclination as the engaging groove 75.

Accordingly, when the cylinder actuator 76 extends its rod and the engaging groove 75 and the engaging protrusion 78 are engaged with each other, the turning tube 68 can be stopped at each turning position with high accuracy.

Incidentally, it is also possible the engaging protrusion 78 is formed on the first engaging piece 74A, and the engaging groove 75 is formed on the second engaging piece 74B.

As explained above, the transferring means 8 has the turning arm 65 capable of turning horizontally around the axis of turning 3 and movable up and down.

Further, the loading position P1, the preheating position P2, the vulcanizing position P3 and the cooling position P4 are arranged on the same circumferential line L centered on the axis of turning J.

Accordingly, while achieving simplification of the structure of the transferring means 8, it is possible to accurately perform the transferring-from-and-to of the tire-accompanied rigid core 2T at the loading position P1, the preheating position P2, the vulcanizing position P3 and the cooling position P4.

Further, it is possible to safely handle the high-temperature tire-accompanied rigid core 2T.

Furthermore, it is possible to contribute to the downsizing of the entire tire vulcanizing apparatus.

While description has been made of an especially preferable embodiment of the present invention, the present invention can be carried out by modifying into various embodiments without being limited to the illustrated embodiment.

DESCRIPTION OF REFERENCE SIGNS

1 tire vulcanizing apparatus
2 rigid core
2T tire-accompanied rigid core
3 vulcanizing mold
4 conveying means
5 preheating means
6 vulcanizing means
7 cooling means
8 a transfer mean
11 core main body
22L, 22U support shaft part
25 connector section
28 ball lock mechanism
40L lower mold section
40U upper mold section
41L lower bed
41U upper bed
42 lifting and lowering means
43 mold clamp means
47 pressure plate
55 guide hole
56 column rod
57 cylinder actuator
60 clamp device
61 pressure device
64 annular groove
65 turning arm
J axis of turning
Q1 downside position
T green tire
Y lying-sideways attitude

The invention claimed is:

1. A tire vulcanizing apparatus for vulcanization-molding a green tire formed on an outer surface of a rigid core by putting the green tire in a vulcanizing mold together with the rigid core, comprising:

a conveying means for conveying the tire-accompanied rigid core on the outer surface of which the green tire is formed, to a loading position, while holding a lying-sideways position in which a tire axis is laid vertical, a preheating means for receiving the tire-accompanied rigid core in the lying-sideways position at a preheating position and preheating the tire-accompanied rigid core at the preheating position, a vulcanizing means for receiving the preheated tire-accompanied rigid core in the lying-sideways position at a vulcanizing position and vulcanizing the green tire of the tire-accompanied rigid core at the vulcanizing position, a cooling means for receiving the vulcanized tire-accompanied rigid core in the lying-sideways position at a cooling position and cooling the vulcanized tire-accompanied rigid core at the cooling position, a transferring means for transferring the tire-accompanied rigid core in the lying-sideways position from and to the conveying means, the preheating means, the vulcanizing means and the cooling means, at the loading position, the preheating position, the vulcanizing position and the cooling position, wherein the transferring means comprises a turning arm horizontally turnable around an axis of turning and movable up and down, and the loading position, the preheating position, the vulcanizing position and the cooling position are arranged on a circle having a center on the axis of turning, wherein the rigid core in the lying-sideways position has an upper support shaft part, and the turning arm comprises
  a support rod portion which is vertical and turnable,
  a horizontal arm portion supported by the support rod portion in such a manner that the horizontal arm portion is elevated and lowered freely, and
  a connector section provided at an end of the horizontal arm portion and detachably coupled to the upper support shaft part of the tire-accompanied rigid core in the lying-sideways position.

2. The tire vulcanizing apparatus as set forth in claim 1, wherein the rigid core has
  a toroidal core main body on which the green tire is formed, and
  a support shaft part attached to the core main body and protruding toward both outer sides in the tire axis direction coaxially with the tire axis to form said upper support shaft part and a lower support shaft part, the conveying means, the preheating means, the vulcanizing means and the cooling means each have a connector section having a ball lock mechanism capable of coupling with the lower support shaft part of the tire-accompanied rigid core in the lying-sideways position, and the connector section of the turning arm has a ball lock mechanism capable of coupling with the upper support shaft part of the tire-accompanied rigid core in the lying-sideways position.

3. The tire vulcanizing apparatus as set forth in claim 1, wherein the vulcanizing means has
  a lower bed on which a lower mold section is mounted,
  an upper bed on which an upper mold section is mounted,
  a lifting and lowering means supporting the upper bed in such a manner that the upper bed is elevated and lowered freely, and closing the upper and lower mold sections at a downside position, and
a mold clamp means for clamping the upper and lower mold sections at the downside position, and
the transferring means is provided on the lower bed.

4. The tire vulcanizing apparatus as set forth in claim 3, wherein the lifting and lowering means is composed of
guide holes which penetrate through the upper bed,
two fixed column rods extending vertically and passing through the guide holes and thereby capable of guiding the upper bed in an up-and-down direction, and
two cylinder actuators supported vertically by the lower bed and having a rod whose upper end is fixed to the upper bed.

5. The tire vulcanizing apparatus as set forth in claim 4, wherein the mold clamp means has
a clamp device provided on the upper bed and clamping the column rod at the downside position, and
a pressure device having
an annular groove, which is provided in an upper surface of the lower bed, and which is concentric with the lower mold section, and
an annular pressure plate, which is disposed in the annular groove slidably in the up-and-down direction, and on the upper surface of which the lower mold section is mounted,
the pressure device tightening the upper and lower mold sections by the pressure plate lifting the lower mold section as a result of a pressure of fluid flowing into the annular groove.

6. The tire vulcanizing apparatus as set forth in claim 1, wherein the support rod portion has
a fixed support shaft disposed on the lower bed in a standing manner, and
a turning tube in the form of a square tube supported by the support shaft pivotally therearound through a bearing, and
by being driven by a motor mounted at an upper end of the support shaft, the turning tube is turned around the axis of turning which is concentric to the support shaft.

7. The tire vulcanizing apparatus as set forth in claim 1, wherein the connector section of the turning arm is attached to an end of the arm portion through a turning means supporting the connector section turnably around a center of an axle of the connector section.

8. The tire vulcanizing apparatus as set forth in claim 2, wherein
the vulcanizing means has
a lower bed on which a lower mold section is mounted,
an upper bed on which an upper mold section is mounted,
a lifting and lowering means supporting the upper bed in such a manner that the upper bed is elevated and lowered freely, and closing the upper and lower mold sections at a downside position, and
a mold clamp means for clamping the upper and lower mold sections at the downside position, and
the transferring means is provided on the lower bed.

9. The tire vulcanizing apparatus as set forth in claim 6, wherein the connector section of the turning arm is attached to an end of the arm portion through a turning means supporting the connector section turnably around a center of an axle of the connector section.

10. The tire vulcanizing apparatus as set forth in claim 1, which further comprises a lower bed supported horizontally by a plurality of legs, and in which
the vulcanizing means is provided on the lower bed,
the transferring means is provided on the lower bed, and
in a top view of the tire vulcanizing apparatus, the vulcanizing position is set inside the lower bed, whereas the loading position, the preheating position and the cooling position are set outside the lower bed.

11. A tire vulcanizing apparatus for vulcanization-molding a green tire formed on an outer surface of a rigid core by putting the green tire in a vulcanizing mold together with the rigid core, comprising:
a conveying means for conveying the tire-accompanied rigid core on the outer surface of which the green tire is formed, to a loading position, while holding a lying-sideways position in which a tire axis is laid vertical,
a preheating means for receiving the tire-accompanied rigid core at a preheating position and preheating the tire-accompanied rigid core at the preheating position,
a vulcanizing means for receiving the preheated tire-accompanied rigid core at a vulcanizing position and vulcanizing the green tire of the tire-accompanied rigid core at the vulcanizing position,
a cooling means for receiving the vulcanized tire-accompanied rigid core at a cooling position and cooling the vulcanized tire-accompanied rigid core at the cooling position,
a transferring means for transferring the tire-accompanied rigid core from and to the conveying means, the preheating means, the vulcanizing means and the cooling means, at the loading position, the preheating position, the vulcanizing position and the cooling position,
the transferring means comprising a turning arm horizontally turnable around an axis of turning and movable up and down,
the loading position, the preheating position, the vulcanizing position and the cooling position being arranged on a circle whose center is on the axis of turning, wherein
the tire vulcanizing apparatus comprises a lower bed supported horizontally by a plurality of legs,
the vulcanizing means is provided on the lower bed,
the transferring means is provided on the lower bed, and
in a top view of the tire vulcanizing apparatus, the vulcanizing position is set inside the lower bed, whereas the loading position, the preheating position and the cooling position are set outside the lower bed.

* * * * *